C. E. BLUE.
APPARATUS FOR CHARGING GLASS MOLDS.
APPLICATION FILED SEPT. 9, 1908.
1,015,537.
Patented Jan. 23, 1912.
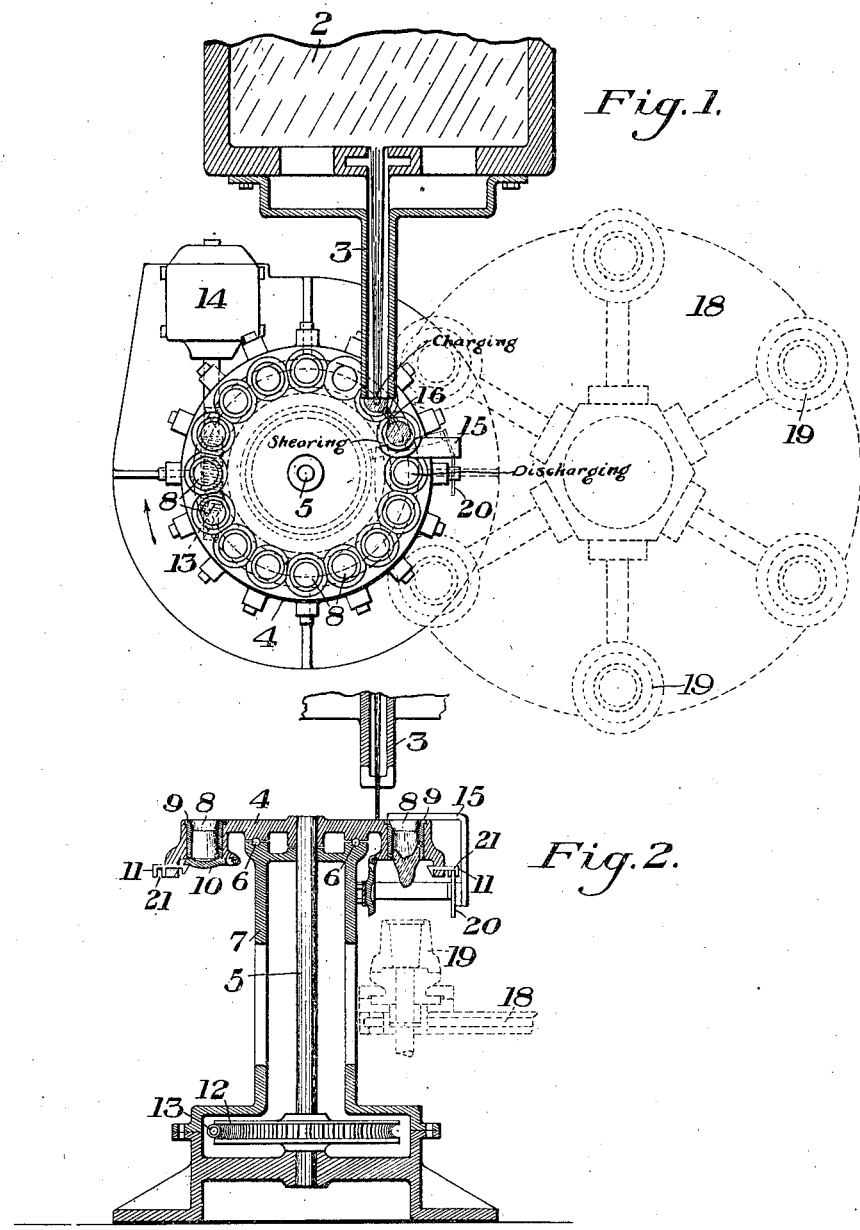
WITNESSES:
R A Balderson
W.W. Swartz
INVENTOR.
C. E. Blue,
BY Bakewell, Byrnes & Parmelee
his ATTORNEYS

UNITED STATES PATENT OFFICE.

CHARLES EDWIN BLUE, OF WHEELING, WEST VIRGINIA.

APPARATUS FOR CHARGING GLASS-MOLDS.

1,015,537.   Specification of Letters Patent.   Patented Jan. 23, 1912.

Application filed September 9, 1908. Serial No. 452,192.

*To all whom it may concern:*

Be it known that I, CHARLES E. BLUE, of Wheeling, Ohio county, West Virginia, have invented a new and useful Improvement in Apparatus for Charging Glass-Molds, of which the following is a full, clear, and exact description, reference being had to the accompanying drawings, forming part of this specification, in which—

Figure 1 of the drawings is a plan view of one form of apparatus embodying my invention, with the melting pot or furnace in section and the mold carrier or molds shown in dotted lines; Fig. 2 is a transverse vertical section of the same; only the discharge spout or tap-out of the melting pot or furnace being shown.

My invention relates to the manufacture of glass, and is designed to provide a novel method of feeding the molten glass into measuring receptacles, adapted each to receive and contain a definite quantity of glass and discharge it into a mold.

In accordance with my invention, the glass is allowed to flow continuously from the melting pot or furnace into a series of measuring receptacles, which are successively brought into position to receive the glass, and means are provided for subsequently shearing or separating those portions of the glass connecting the glass in adjacent receptacles.

The nature of my invention will be best understood by reference to the accompanying drawings, in which I have shown one embodiment thereof, and which will now be described, it being premised, however, that the invention is susceptible of various modifications, by those skilled in the art without departing from the spirit and scope of my invention as defined in the appended claims.

In these drawings, the numeral 2 designates a melting pot or furnace of any suitable character having an overhanging discharge spout or tap-out 3 through which a continuous stream of glass is designed to flow so long as the machine is in operation.

4 designates a rotary carrier, secured to a central vertical shaft 5 and mounted, preferably upon ball bearings 6, upon a supporting frame 7. The carrier 4 is provided with a plurality of measuring receptacles 8, arranged in a circular series and set closely adjacent to each other. Each of these receptacles is preferably formed with a flaring upper portion 9, and its bottom is closed by a hinged valve or cap 10 normally secured in closing position by a sliding latch 11. The shaft 5 is rotated by any suitable gearing. In the drawings, I have shown it as carrying a worm wheel 12 engaged by a worm 13 driven by an electric motor 14.

The carrier 4 is arranged to be rotated underneath the overhanging end of the discharge spout 3, so that the receptacles will be successively brought into position to receive the glass discharged therefrom. Intermediate of the charging station and the discharging station, which are indicated respectively by the words "Charging" and "Discharging" in Fig. 1 of the drawing, I provide an overhanging scraper arm 15, which is in position to extend over the circular path of movement of the receptacles, and thereby scrape off or remove the connecting portion 16 of the glass, connecting the glass in two adjacent receptacles, as indicated in Fig. 1.

18 designates a suitable carrier of any kind, forming no part of the present invention, upon which are mounted a series of molds 19 arranged to be brought, by the movement of the carrier 18, successively underneath one of the receptacles at the discharging station.

For the purpose of withdrawing the latches 11 to allow the bottom valve or closure 10 to open to permit the contents of the receptacles to be discharged into the molds at the discharging station, I provide the cam member 20, which is adapted to be engaged by a fork 21 on the outer end of each sliding latch 11 in such a manner as to withdraw said latch and allow the bottom closure or valve 10 to open in the manner shown at the right-hand side of Fig. 2.

The operation will be readily understood. Glass flows continuously from the discharge spout 3 and successively fills the receptacles 9. These are then carried underneath the scraper or shear 15, by which the connecting portion of glass is removed, thus effecting a cutting off of the glass at this point instead of at the point of discharge. As each receptacle reaches the discharging station its bottom closure is opened in the manner described, and the contents of the receptacle are discharged into one of the molds 19.

The advantages of my invention will be apparent to those skilled in the art, since it provides a simple and efficient means by which measured quantities of molten glass may be delivered into molds without the gathering operation usually employed.

It will readily be understood by those familiar with the art that various changes may be made in the support or carrier and the actuating mechanism therefor.

What I claim is:—

1. An apparatus for charging glass molds, comprising a carrier, a plurality of adjacent open top receptacles on said carrier, the upper surface of the carrier extending from receptacle to receptacle and arranged to form a continuous surface between receptacles, means to continuously move said carrier, means for delivering a continuous stream of molten glass to the receptacles, and a stationary scraper resting on the carrier, said scraper being arranged to scrape the glass from the upper surface of the carrier between adjacent receptacles into one of said receptacles; substantially as described.

2. Apparatus for charging glass molds, comprising a carrier, a plurality of open top receptacles adjacent to each other on said carrier, the upper surface of the carrier extending from receptacle to receptacle and arranged to form a continuous smooth surface between adjacent receptacles, a charging station above said carrier, a discharging station below said carrier, means for continuously moving the carrier and the receptacles past the charging and discharging stations, a stationary scraper resting on the carrier between the charging and discharging stations, said scraper being arranged to scrape the molten glass on the top surface of the carrier between adjacent molds into the mold which has just passed from under the charging station; substantially as described.

In testimony whereof, I have hereunto set my hand.

CHARLES EDWIN BLUE.

Witnesses:
W. V. HOGE, Jr.,
M. L. BROWN.

---

Copies of this patent may be obtained for five cents each, by addressing the "Commissioner of Patents, Washington, D. C."